Aug. 6, 1957
J. CHARNLEY
2,801,631
FRACTURE SCREW ADJUSTING MEANS
Filed Aug. 18, 1954
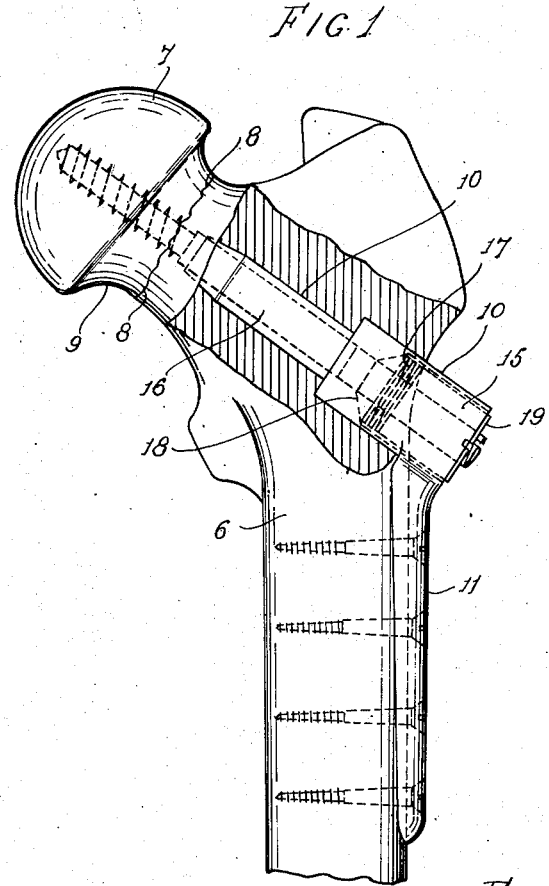
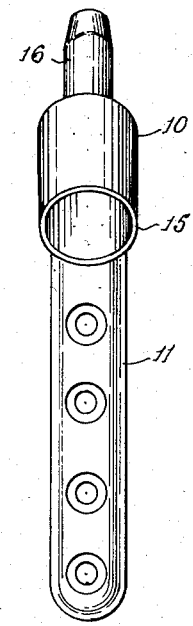
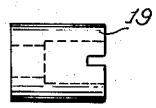

United States Patent Office 2,801,631
Patented Aug. 6, 1957

2,801,631

FRACTURE SCREW ADJUSTING MEANS

John Charnley, Manchester, England

Application August 18, 1954, Serial No. 450,673

1 Claim. (Cl. 128—92)

This invention concerns a surgical device for use in connection with fractures of the neck of the femur.

Fractures of the neck of the femur are notoriously prone to failure of re-union, and several proposals have been made for mechanically assisting re-union, the aim being to retain the severed parts of the bone in their correct relative positions until union takes place.

Modern biological research suggests that union can be assisted and accelerated if the severed portions of the bone are urged together by spring means. It has been proposed, therefore, to unite the severed head of the femur to the shaft by a screw passing through the shaft and into the head, and to provide a compression spring on the outer end of the screw to draw the severed faces of the head and shaft together. This arrangement has not proved entirely satisfactory since it has frequently allowed the head of the bone to slip, the screw not being positively positioned in the hollow shaft of the bone. This undesired slippage is often helped by the fact that the general plane of the fracture is at an angle to the axis of the screw when in its proper position and if the fracture is comminuted as is often the case the severed faces fail to key together against slip.

The object of the present invention is to provide an improved means whereby the severed parts of a femur may be urged together without danger of their moving out of their proper relative positions, thus assuring a more rapid union of the severed faces.

According to the invention, there is a mounting or housing adapted to be secured to the shaft of a femur and having a guide or bearing for a screw passing through and out of such guide into the head of the femur, with spring means tending to retract the screw into the guide and thereby pull and hold the severed faces of the bone together.

Conveniently, the said mounting has an extension or arm to be along the shaft of the bone and be affixed thereto by screws or other suitable means, it has a hollow cup-like part recessed into the shaft of the bone and a tubular extension of such cup-like part to form the guide or bearing for the screw. In said cup-like part is a compression spring encircling the screw and a nut for varying the degree of compression of the spring.

Such an arrangement prevents the screw from slipping out of place in the hollow end of the bone shaft and therefore allows a continuous compression between the severed faces in the direction of the screw, despite any angularity in the plane of the fracture and even if the fracture is more comminuted at one side than another.

The invention is more particularly set forth with reference to the accompanying drawings in which:

Fig. 1 is an elevation partly in section showing the invention applied to a femur broken at the neck;

Fig. 2 is a front elevation of part of the apparatus used for joining the broken parts; and Figs. 3, 4 and 5 show other parts of the apparatus.

As shown in the drawings in which the shaft of the femur is designated by the numeral 6, the head by 7, and the fracture line by 8 across the neck 9, there is mounted a housing shown in front elevation in Fig. 2.

This housing comprises a hollow part 10 having an extension or arm 11 provided with screw holes through which screws are passed to secure it to the shaft of the femur 6. The angle between the hollow part and the extension or arm is such that it corresponds with the angle between the shaft 6 and the head 7, and the hollow part 10 is passed into the top of the femur as shown in Fig. 1.

Inside the hollow part 10 is a member shown separately in Fig. 3 having a wood screw thread 12 at one end and a machine thread 13 at the other, a slot 14 being provided for turning the screw.

As shown in Figs. 1 and 2, the hollow part 10 has a lower part 15 of larger bore than the top part 16, and in the larger part a spring 17 shown in Fig. 5 is placed around the rod and abuts on the cone shaped end 18 at the top end of the larger and lower hollow part 15, and on the end having the machine thread 13 is a nut 19, see Fig. 4, provided with slots whereby it can be turned by a bifurcated screw driver. The combined length of the lower part 15 and top part 16 of the hollow part 10 should be greater than half the length of the rod so as to prevent slippage of the rod when the assembly is attached to the femur.

When the apparatus is in use as shown in Fig. 1, the fitting shown above in Fig. 2 is placed in position by securing the extension or arm 11 to the shaft of the femur on the side remote from the fracture with the tubular part 10 passing through the top part of the femur which is not itself of sufficient strength or substance to afford a firm hold for a screw. When this fitting is in place, the head 7 is put in position as exactly as possible with regard to the line of fracture 8, and the rod (Fig. 3) is passed up the tube 10 and the end 12 is screwed into the head 7. The spring 17 is put in place followed by the nut 19 which, as it is screwed on the part 13 to compress the spring, is urged backward by the spring thus pulling the head 7 tightly against the neck 9 and holding the two sides of the fracture firmly together and assisting them to knit.

I claim:

Surgical screw adjusting means for use in connection with fractures of the neck of the femur comprising an elongated housing having an arm integrally joined to the lower end thereof and inclined thereto at the same angle as the axis of the neck of the femur is inclined to the shaft of the femur, said arm being adapted to be secured to the shaft of the femur, a screw threaded at both ends and received in the elongated housing being positively guided thereby the length of said housing being more than half the length of said screw and the inner end of the housing being of smaller bore than the outer end thereof, one end of said screw being adapted to enter the head of the femur, a nut disposed in the outer end of the housing and screwed on the other end of said screw, a spring stop interiorly disposed in said housing intermediate the ends thereof and a spring interposed between said spring stop and said nut whereby said nut is adapted to adjust the outward bias of the screw and hold the head tight against the femur along the line of fracture.

References Cited in the file of this patent

UNITED STATES PATENTS

| | | |
|---|---|---|
| 2,397,545 | Hardinge | Apr. 2, 1946 |
| 2,612,159 | Collison | Sept. 30, 1952 |
| 2,772,676 | Pohl | Dec. 4, 1956 |

OTHER REFERENCES

Surgical Equipment Magazine, published by the Ohio Chemical & Surgical Equipment Co., Madison, Wis. in July 1940, pp. 14–15. (Copy in Division 55.)